US012607763B2

(12) United States Patent
Lin et al.

(10) Patent No.: US 12,607,763 B2
(45) Date of Patent: Apr. 21, 2026

(54) CAPACITIVE SENSING SYSTEM USING ACTIVE SHIELDING AND OPERATING METHOD THEREOF

(71) Applicant: PIXART IMAGING INC., Hsin-Chu County (TW)

(72) Inventors: Yu-Sheng Lin, Hsin-Chu County (TW); Chin-Hua Hu, Hsin-Chu County (TW); Yu-Han Chen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 257 days.

(21) Appl. No.: 18/512,250

(22) Filed: Nov. 17, 2023

(65) Prior Publication Data

US 2025/0164659 A1 May 22, 2025

(51) Int. Cl.
*G01V 3/08* (2006.01)
*G06F 3/02* (2006.01)

(52) U.S. Cl.
CPC .............. *G01V 3/088* (2013.01); *G06F 3/02* (2013.01)

(58) Field of Classification Search
CPC .................................. G01V 3/088; G06F 3/02

USPC ........................................................ 324/663
See application file for complete search history.

(56) References Cited

U.S. PATENT DOCUMENTS

| | | | | |
|---|---|---|---|---|
| 3,626,287 A | * | 12/1971 | Di Niro ............. | G01R 27/2605 324/688 |
| 5,539,323 A | * | 7/1996 | Davis, Jr. ................ | G01V 9/00 331/65 |
| 10,114,513 B2 | | 10/2018 | Staszak et al. | |
| 11,283,446 B2 | | 3/2022 | Faber et al. | |
| 2019/0297408 A1 | * | 9/2019 | Mohammadi ........ | H04R 1/1016 |
| 2020/0245884 A1 | * | 8/2020 | Blomqvist ............... | A61B 5/25 |

* cited by examiner

*Primary Examiner* — Stephanie E Bloss
*Assistant Examiner* — Michael A Harrison
(74) *Attorney, Agent, or Firm* — HAUPTMAN HAM, LLP

(57) ABSTRACT

There is provided a capacitive sensing system including multiple sensor electrodes, an insulating layer and a single active shielding metal. The single active shielding metal has an overlapped region with each of the multiple sensor electrodes. The insulating layer is arranged between the single active shielding metal and the multiple sensor electrodes. When one of the multiple sensor electrodes is driven by a driving signal, the rest of the multiple sensor electrodes are grounded or receive an active shielding signal, and the single active shielding metal receives the active shielding signal.

15 Claims, 8 Drawing Sheets

<u>200</u>

CAPACITIVE SENSING SYSTEM USING ACTIVE SHIELDING AND OPERATING METHOD THEREOF

FIELD OF THE DISCLOSURE

This disclosure generally relates to a capacitive detection and, more particularly, to a capacitive sensing system using active shielding and an operating method thereof.

BACKGROUND OF THE DISCLOSURE

Please refer to FIG. 1, it is a conventional capacitive sensing system including multiple sensing channels, shown as channel 1 to channel N. To improve the anti-noise capability, a shielding layer 15 is respectively arranged corresponding to each channel, and multiple shielding layers 15 are separated from each other. An insulating layer 13 is arranged between the electrode layer 11, including the channel 1 to channel N, and the multiple shielding layers 15. In operation, each shielding layer 15 receives a shielding signal corresponding to a charging signal inputted to the channel thereabove.

However, because it is required to independently transmit a shielding signal to different shielding layers 15 respectively, multiple signal lines respectively connected to the multiple shielding layers 15 are required that leads to high layout complexity and difficult manufacturing process, especially when the arrangement space is limited. Furthermore, the calculation load of a processing unit for generating driving signals and shielding signals as well as for processing detection signals is relatively high.

Therefore, it is required to provide a capacitive sensing system that can be manufactured easily and forms effective noise shielding is required by the art.

SUMMARY

Accordingly, the present disclosure provides a capacitive sensing system that is arranged with a single shielding metal for shielding all of multiple sensing channels, and an operating method of the capacitive sensing system.

The present disclosure further provides a sequential detection based capacitive sensing system and an operating method thereof. When one channel is performing detection, other channels perform a ground shielding or an active shielding, and the single shielding metal performs the active shielding so as to achieve the purpose of reducing the layout complexity.

The present disclosure further provides a parallel detection based capacitive sensing system and an operating method thereof. By arranging an operational amplifier and an input capacitor between a sensor chip and the single shielding metal, the noise interference is reduced and the active shielding of multiple detection channels is covered by the same shielding metal.

The present disclosure further provides a capacitive sensing system including an electrode layer and a single shielding metal. The electrode layer includes a first electrode and a second electrode. The first electrode is connected to a first sensor line and configured to receive a first driving signal. The second electrode is connected to a second sensor line and configured to receive a second driving signal. The single shielding layer is configured to receive a shielding signal, and has an overlapped region with the first electrode and the second electrode, respectively.

The present disclosure further provides a capacitive sensing system including a sensor chip, an input capacitor, an electrode layer, a single shielding metal and an operational amplifier. The input capacitor is connected to the sensor chip. The electrode layer includes a first electrode and a second electrode. The first electrode is configured to receive a first driving signal from the sensor chip via a first sensor line. The second electrode is configured to receive a second driving signal from the sensor chip via a second sensor line. The single shielding metal is configured to receive a shielding signal from the sensor chip, and has an overlapped region with the first electrode and the second electrode, respectively. The operational amplifier is connected between the single shielding metal and the input capacitor.

The present disclosure further provides an operating method of a capacitive sensing system. The capacitive sensing system includes a first electrode, a second electrode and a single shielding layer having an overlapped region with the first electrode and the second electrode, respectively. The operating method includes: charging the first electrode and the single shielding metal within a first time interval, wherein the first electrode and the single shielding metal have identical charging waveforms within the first time interval; and charging the second electrode and the single shielding metal within a second time interval, wherein the second electrode and the single shielding metal have identical charging waveforms within the second time interval.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to perform the hand detection using a capacitive sensing system incorporating active shielding, e.g., adapted to a vehicle steering wheel having an ability to detect whether the hand(s) has left the steering wheel or not (i.e. hand off detection), but not limited to. The active shielding of the present disclosure is to shield multiple sensor electrodes using a single shielding metal to simplify the layout complexity and improve the anti-noise capability. A target of the active shielding is, for example, a heater, but not limited to. The target is any component that may induce noise to the sensor electrodes mentioned below.

Figure 1:
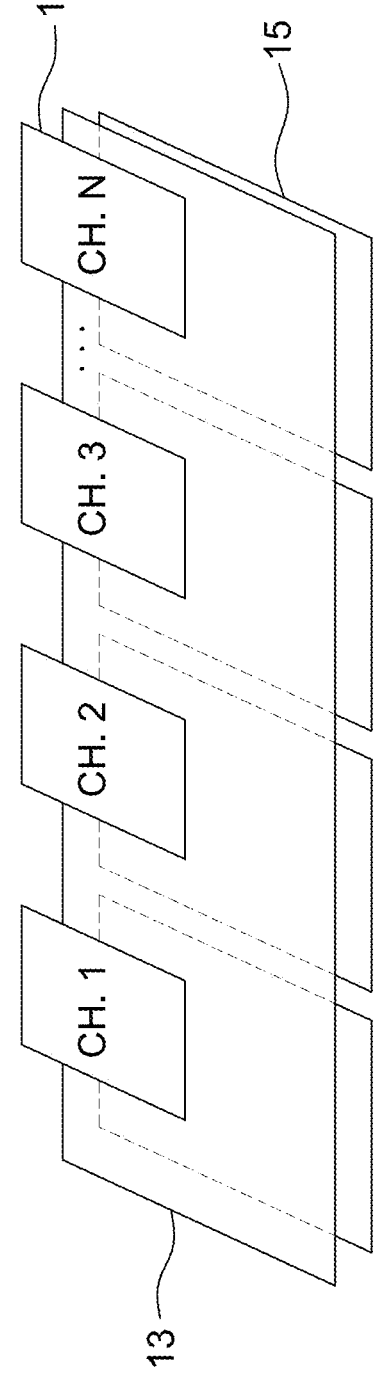
FIG. 1 is a schematic diagram of a conventional multi-channel capacitive sensing system.
Figure 2:
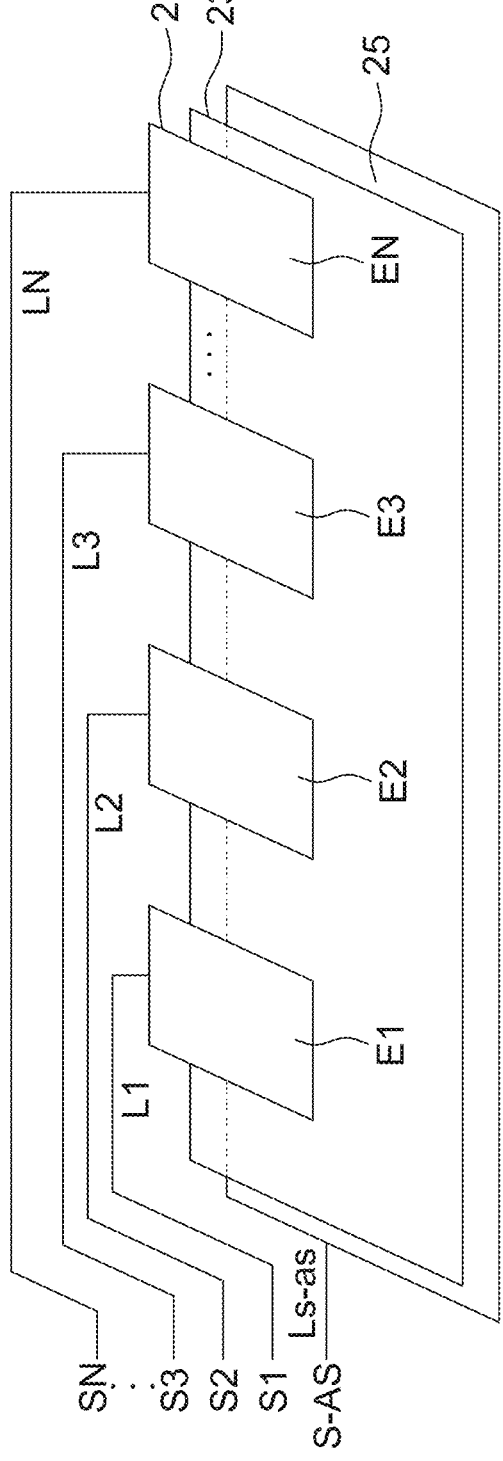
FIG. 2 is a schematic diagram of a capacitive sensing device using active shielding according to one embodiment of the present disclosure.

Please refer to FIG. 2, it is a schematic diagram of a capacitive sensing device 200 according to one embodiment of the present disclosure. The capacitive sensing device 200 includes an electrode layer 21, an insulting layer 23 and a single shielding metal 25. The insulating layer 23 may include any suitable insulating material or printed dielectric inks without particular limitations. In one aspect, the electrode layer 21 and the single shielding metal 25 are printed on opposite surfaces (e.g., top and bottom surfaces in FIG. 2) of the insulting layer 23, but not limited thereto.

The electrode layer 21 includes multiple sensor electrodes, e.g., shown as a first electrode E1, a second electrode E2, a third electrode E3 . . . and an N'th electrode EN. A number of the sensor electrodes is determined according to actual requirements. Each sensor electrode includes printed conductive inks, but not limited to. The first electrode E1 receives a first driving signal S1 from a sensor chip 51 (referring to FIG. 5) via a first sensor line L1; the second electrode E2 receives a second driving signal S2 from the sensor chip 51 via a second sensor line L2; and so on. In one aspect, the driving signals S1 to Sn are charging currents to form a charging waveform to each of the sensor electrodes E1 to EN. The charging waveforms are different (e.g., Cgp1 to CgpN mentioned below) corresponding to a touch state and a non-touch state such that a processor (e.g., micro controller unit, application specific integrated circuit or field programmable gate array) in the sensor chip 51 may perform the hand off detection according to a change of each of the charging waveforms Cgp1 to CgpN, e.g., a charging interval is changed from the touch state to the non-touch state, or from the non-touch state to the touch state.

The single shieling metal 25 receives a shielding signal S-AS (e.g., a charging current) from the sensor chip 51, and the shielding metal 25 has an overlapped region respectively with the multiple sensor electrodes E1 to EN of the electrode layer 21. The "single" shielding metal mentioned herein is referred to that parts of a shielding metal overlapped (e.g., in top and down directions) with the multiple sensor electrodes E1 to EN are belong to one piece of metal. The single shielding metal 25 includes printed conductive inks to form a mesh or a plate without particular limitations.

Operating methods of the capacitive sensing device 200 are illustrated hereinafter, and two of the multiple sensor electrodes E1 to EN, e.g., the first electrode E1 and the second electrode E2, are used as examples for illustration.

Figure 3:
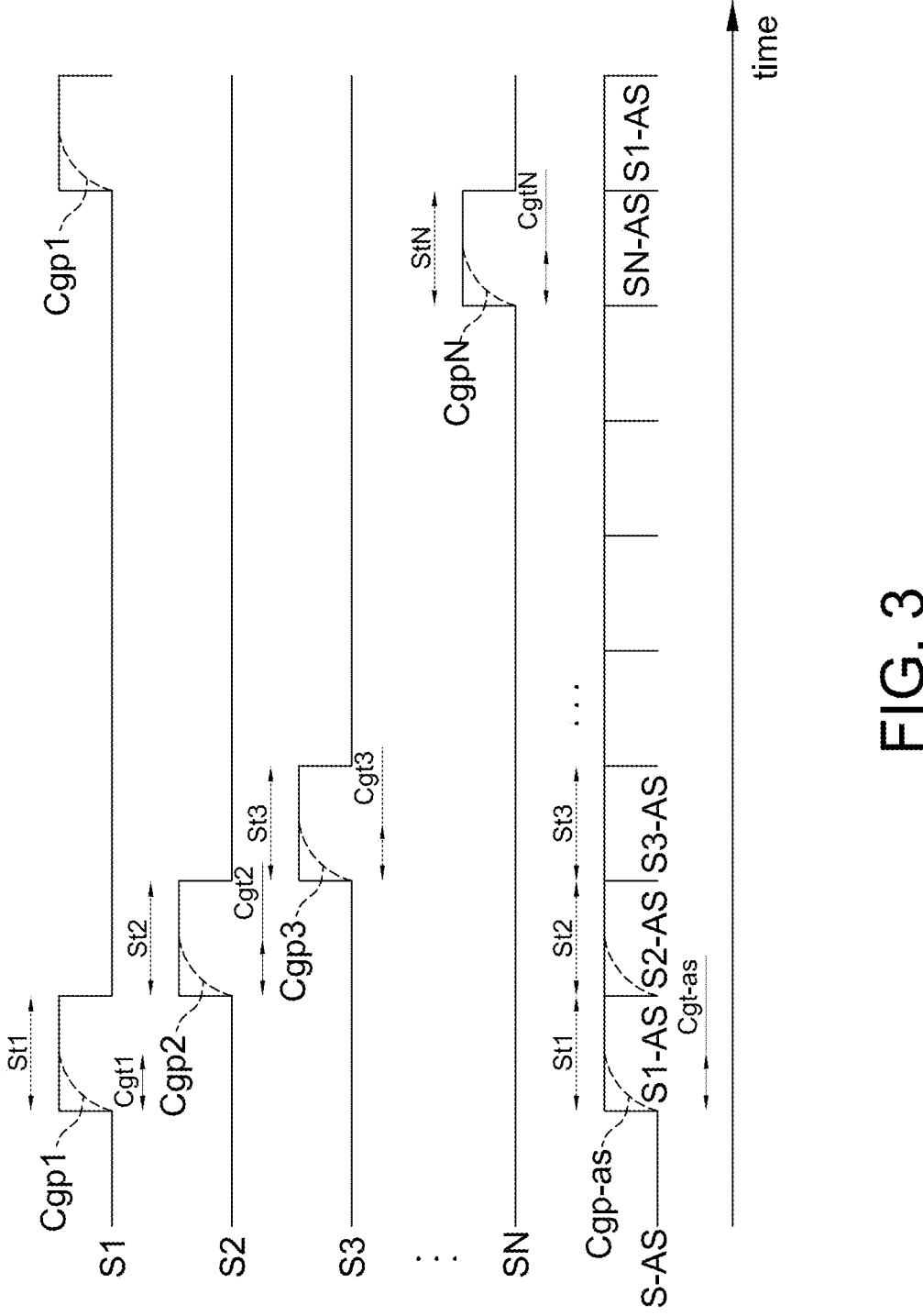
FIG. 3 is a signal timing diagram of an operation of the capacitive sensing device in FIG. 2.

Please refer to FIG. 3, it is a signal timing diagram of an operation of the capacitive sensing device 200 in FIG. 2. The first driving signal S1 charges the first electrode E1 within a first time interval St1 to have a charging waveform Cgp1 and a charging interval Cgt1, e.g., a voltage rising interval. The second driving signal S2 charges the second electrode E2 within a second time interval St2, behind the first time interval St1, to have a charging waveform Cgp2 and a charging interval Cgt2, e.g., a voltage rising interval. Corresponding to a touch state (e.g., hand on steering wheel) and a non-touch state (e.g., hand off steering wheel), the charging waveforms Cgp1 and Cgp2 are different to cause the charging intervals Cgt1 and Cgt2 to be different. The processor in the sensor chip 51 performs the hand off detection according to the variation of the charging intervals, but not limited to. The shielding signal S-AS is coupled to the single shielding metal 25 within the first time interval St1 and the second time interval St2 to form active shielding.

In order to form the active shielding, a charging waveform Cgp-as of the shielding signal S-AS that charges the single shielding metal 25 is preferably corresponding to (e.g., identical to or being a ratio thereof) the charging waveforms Cgp1, Cgp2 . . . . CgpN, respectively in each sensing period, i.e. St1, St2 . . . . StN. It is appreciated that when the first electrode E1 and the second electrode E2 have identical areas, they also have identical ground capacitance. Therefore, an identical driving signal may generate an identical charging waveform, and the identical charging waveforms of the first electrode E1 and the second electrode E2 have the same frequency, amplitude and phase.

However, when the first electrode E1 and the second electrode E2 have different areas (e.g., E1<E2), there are two ways to implement the active shielding mentioned therein herein.

In the first way, a charging waveform Cgp1 of the first electrode E1 charged by the first driving signal S1 in the first time interval St1 is different from a charging waveform Cgp2 of the second electrode E2 charged by the second driving signal S2 in the second time interval St2, e.g., the driving signals S1 and S2 being identical such that the first electrode E1 is charged faster. Accordingly, the charging waveforms Cgp-as of the single shielding metal 25 charged by the shielding signal S-AS are different in the first time interval St1 and the second time interval St2 to respectively corresponding to/be matched with the charging waveform Cgp1 of the first electrode E1 and the charging waveform Cgp2 of the second electrode E2, e.g., the single shielding metal 25 being charged faster in the first time interval St1.

In the second way, a charging waveform Cgp1 of the first electrode E1 charged by the first driving signal S1 in the first time interval St1 is identical to a charging waveform Cgp2 of the second electrode E2 charged by the second driving signal S2 in the second time interval St2, e.g., the driving signals S1 and S2 being different (e.g., S1<S2). For example, a larger electrode is charged by a larger charging current, and a smaller electrode is charged by a smaller charging current. Accordingly, the charging waveform Cgp-as of the single shielding metal 25 charged by the shielding signal S-AS is the same in the first time interval St1 and the second time interval St2 to respectively corresponding to/be matched with the charging waveform Cgp1 of the first electrode E1 and the charging waveform Cgp2 of the second electrode E2.

Please refer to FIG. 3 again, in the present disclosure, when one sensor electrode (or simply referred to one sensor) is performing the detection, the other sensor electrodes may also be used as shielding electrodes. In one aspect, the second electrode E2 (and all other sensor electrodes E3 to EN, if included) is grounded in the first time interval St1 to form a ground shielding; the first electrode E1 (and all other sensor electrodes E3 to EN, if included) is grounded in the second time interval St2 to form a ground shielding; and so on.

In another aspect, when one sensor electrode is performing the detection, only adjacent electrodes of said one sensor electrode are used as shielding electrodes but the other sensor electrodes are not used as shielding electrodes. For example, when the sensor electrode E2 is performing the detection, only sensor electrodes E1 and E3 are grounded and the other sensor electrodes E4 to EN (if included) are not required to be grounded but can be floated or maintaining in a particular DC voltage level.

Figure 4:
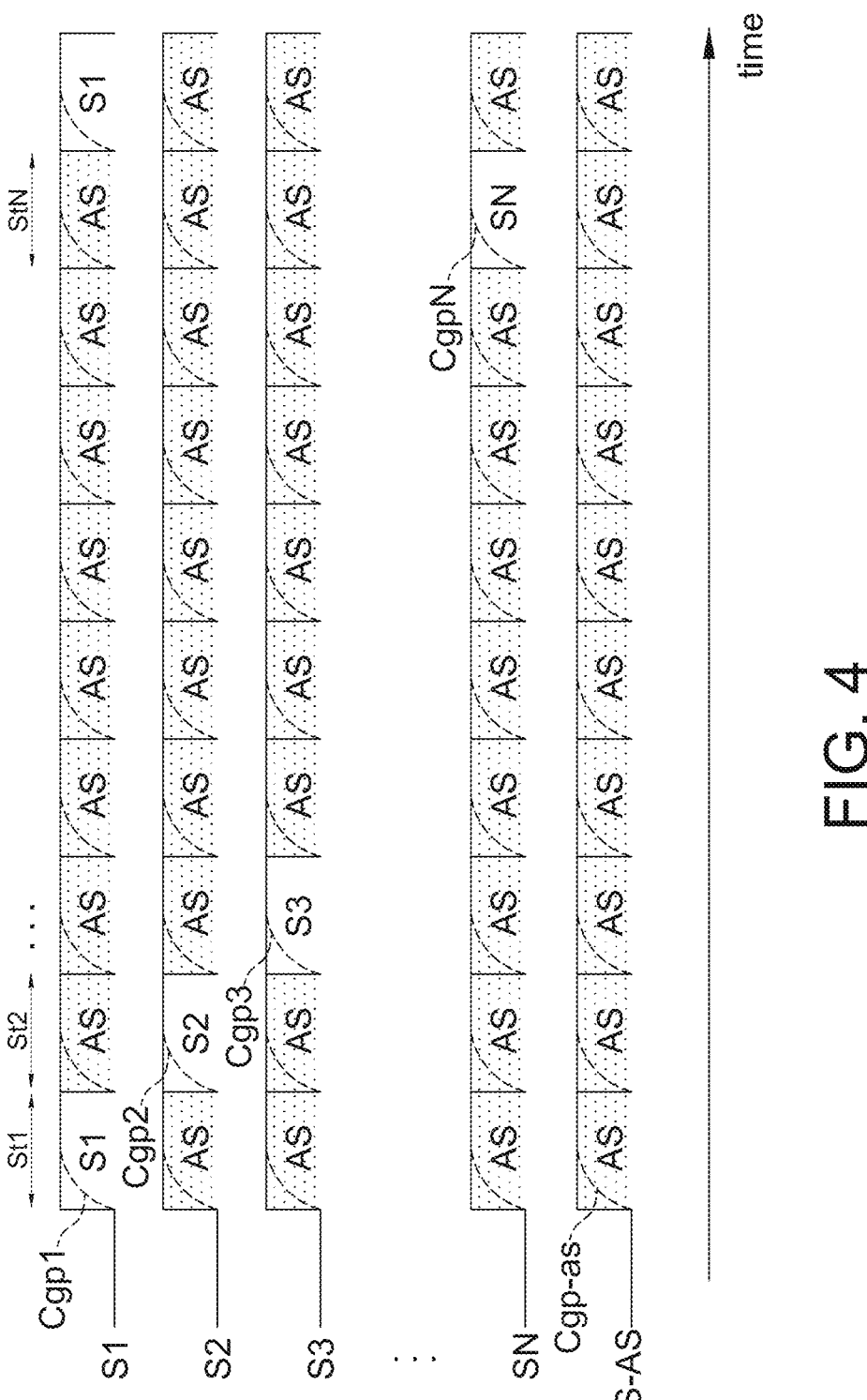
FIG. 4 is a signal timing diagram of another operation of the capacitive sensing device in FIG. 2.

Please refer to FIG. 4, in another aspect, the second electrode E2 (and all other sensor electrodes E3 to EN, if included) is coupled to a second shielding signal (e.g., S2=S-AS2<S-AS since the single shielding electrode 25 is larger than the second electrode E2) in the first time interval St1 to form active shielding. Preferably, by controlling the driving parameter (e.g., driving current, but not limited to), the second electrode E2 (and all other sensor electrodes E3 to EN, if included) and the first electrode E1 have identical charging waveforms. The first electrode E1 (and all other sensor electrodes E3 to EN, if included) is coupled to a first shielding signal (e.g., S1=S-AS2<S-AS since the single shielding electrode 25 is larger than the first electrode E1) in the second time interval St2 to form active shielding. Preferably, by controlling the driving parameter (e.g., driving current, but not limited to), the first electrode E1 (and all other sensor electrodes E3 to EN, if included) and the second electrode E2 have identical charging waveforms. Preferably in the present disclosure, within all sensing periods St1 to StN, all the sensor electrodes E1 to EN and the single shielding metal 25 have identical charging waveforms to achieve good active shielding performance, i.e. Cgp1=Cgp2= . . . =CgpN=Cgp-as. In one aspect, all the sensor electrodes E1 to EN of the capacitive sensing device 200 are arranged to have identical areas. In another aspect, when at least a part of the sensor electrodes E1 to EN of the capacitive sensing device 200 have different areas (i.e. having different ground capacitance), the charging waveforms are controlled to be identical to one another by adjusting the corresponding driving signals (e.g., adjusting driving current).

Figure 8:
FIG. 8 is a signal timing diagram of a further operation of the capacitive sensing device in FIG. 2.

In another aspect, when one sensor electrode is performing the detection, only adjacent electrodes of the one sensor electrode are used as active shielding electrodes but the other sensor electrodes are floated or grounded or maintaining in a particular DC voltage level. For example, when the sensor electrode E2 is performing the detection, only sensor electrodes E1 and E3 are active shielding but the sensor electrodes E4 to EN, are floating or ground shielding or maintaining in a particular DC voltage level, referring to FIG. 8 that shows the sensor electrodes E4 to EN are ground shielding.

Figure 5:
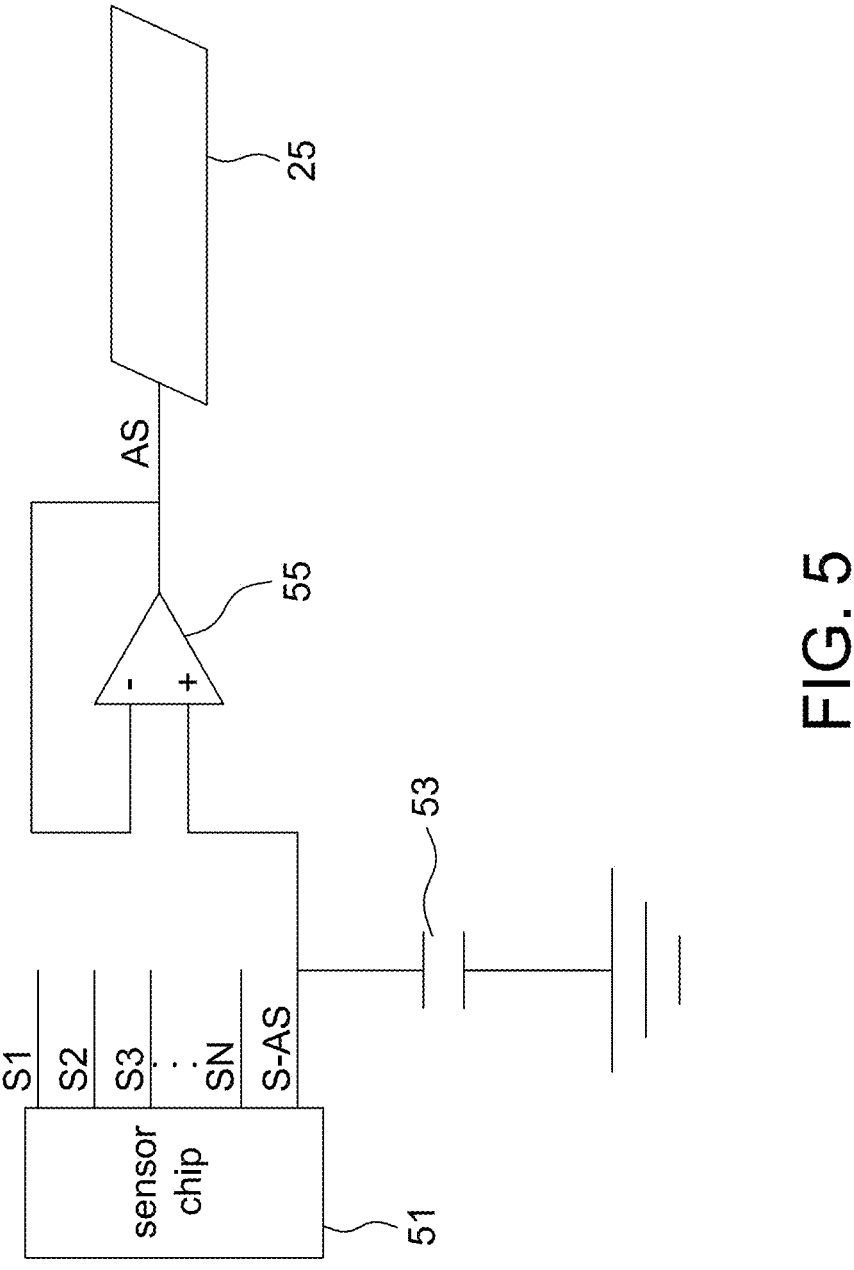
FIG. 5 is a schematic diagram of a capacitive sensing system according to one embodiment of the present disclosure.

Please refer to FIG. 5, it is a schematic diagram of a capacitive sensing system 500 according to one embodiment of the present disclosure, including a sensor chip 51 coupled to the capacitive sensing device 200 shown in FIG. 2 to provide driving signals S1 to SN and a shielding signal S-AS to the capacitive sensing device 200 via the sensor lines L1 to LN and a signal line Ls-as. The sensor chip 51 (e.g., a processor therein) further identifies a touch state according to charging intervals, e.g., Cgt1, Cgt2 . . . . CgtN shown in FIG. 3. The signals S1 to SN and S-AS in FIG. 5 are provided to the signals S1 to SN and S-AS in FIG. 2.

In the case that an input resistor of the sensor chip 51 is large, the detection result can be easily interfered by noises. In this case, the capacitive sensing system 500 further includes an input capacitor 53 and an operational amplifier 55 connected between the sensor chip 51 and the single shielding metal 25 to reduce the noise interference. In one aspect, the input capacitor 53 is arranged to have a capacitance identical to one of the first electrode E1 and the second electrode E2 (and all other sensor electrodes E3 to EN, if included) having a larger ground capacitance (preferably the sensor electrode having the largest capacitance) to have the active shielding ability covering all sensor electrodes E1 to EN. In the present disclosure, the operational amplifier 55 is used as a voltage follower.

FIGS. 3 and 4 show the sequential detection performed by the capacitive sensing device 200 and system 500 of the present disclosure. Please refer to FIG. 6, it is a signal timing diagram of the parallel detection performed by the capacitive sensing device 200 and system 500 according to one embodiment of the present disclosure. In this embodiment, the first driving signal S1, the second driving signal S2 (and all other driving signals S3 to SN, if included) and the shielding signal S-AS respectively charge the first electrode E1, the second electrode E2 (and all other sensor electrodes E3 to EN, if included) and the single shielding metal 25 within every sensing period St1 to StN, respectively. Preferably, the charging waveforms Cgp1, Cgp2 . . . . CgpN and Cgp-as corresponding to the first electrode E1, the second electrode E2 (and all other sensor electrodes E3 to EN, if included) and the single shielding metal 25 are identical to one another to achieve good active shielding performance, e.g., implemented by arranging all the sensor electrodes E1 to EN with identical areas, or by controlling the driving parameters as mentioned above.

Figure 7:
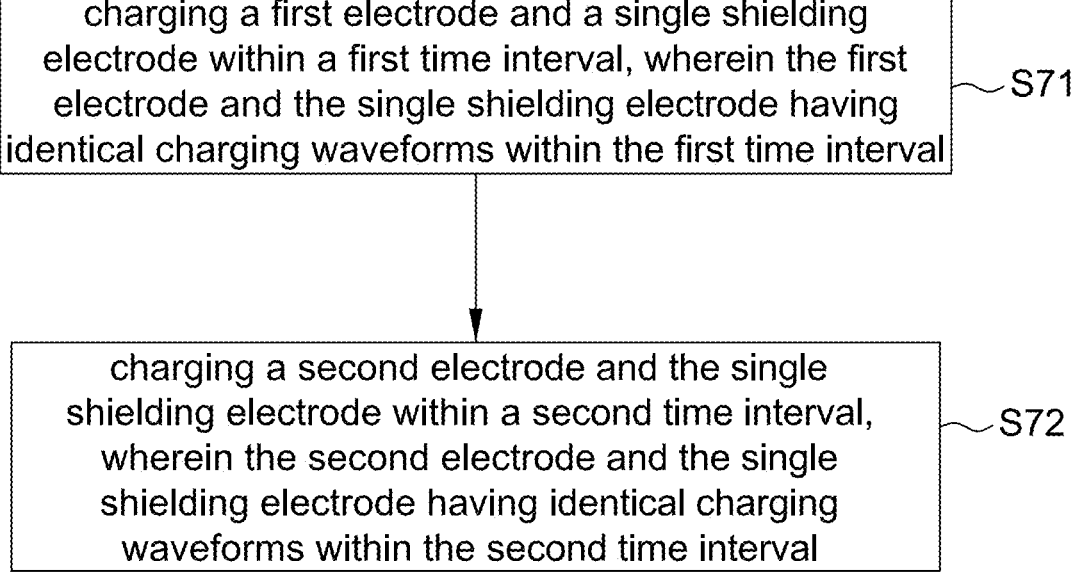
FIG. 7 is a flow chart of an operating method of a capacitive sensing system according to one embodiment of the present disclosure.

Please refer to FIG. 7, it is an operating method of a capacitive sensing device 200 and capacitive sensing system 500 according to one embodiment of the present disclosure. The operating method includes: charging a first electrode and a single shielding metal within a first time interval, wherein the first electrode and the single shielding metal have identical charging waveforms within the first time interval (Step S71); and charging a second electrode and the single shielding metal within a second time interval, wherein the second electrode and the single shielding metal have identical charging waveforms within the second time interval (Step S72).

Figure 6:
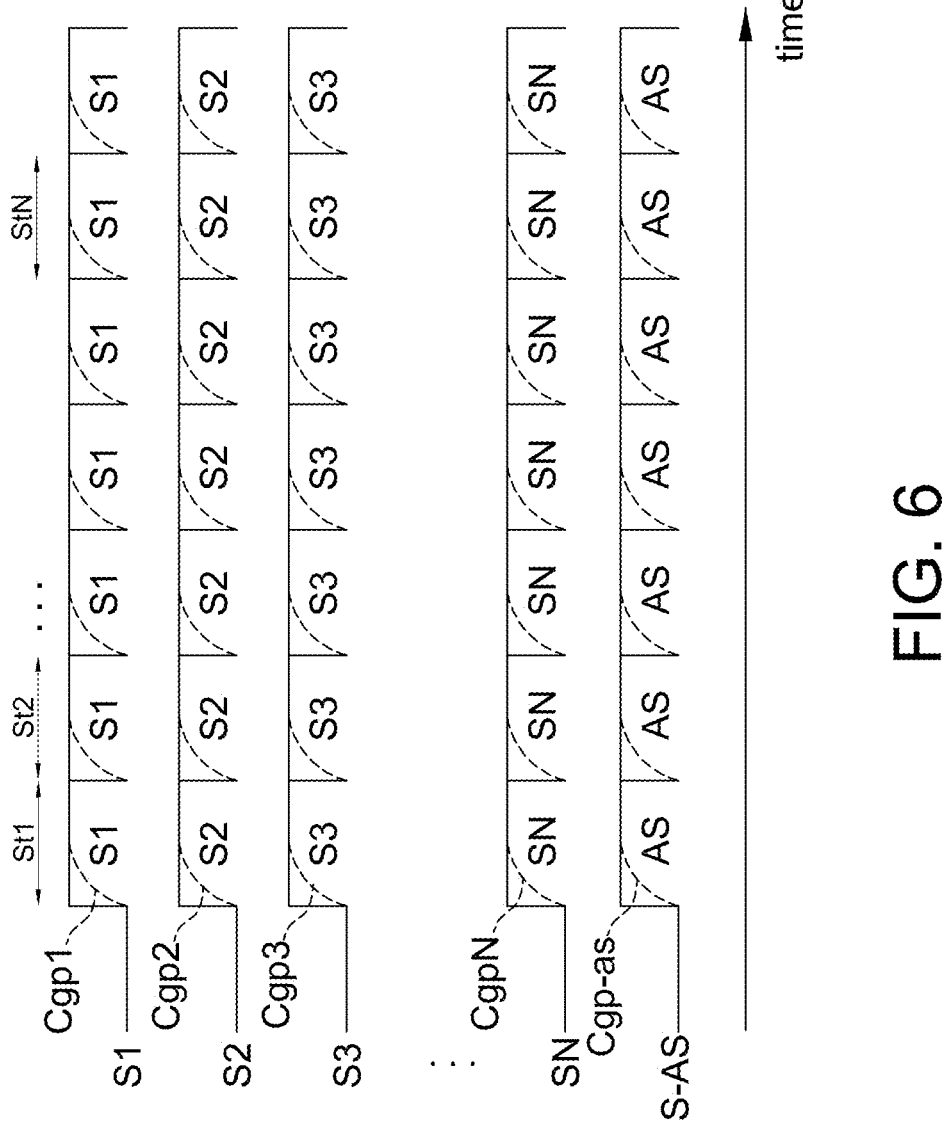
FIG. 6 is a signal timing diagram of the capacitive sensing system in FIG. 5 performing the parallel detection and using active shielding.

Please refer to FIGS. 3, 4 and 6, no matter in the sequential driving (e.g., FIGS. 3 and 4) or in the parallel driving (e.g., FIG. 6), within the first time interval St1, the sensor chip 51 charges the first electrode E1 with a first driving signal S1 and charges the single shielding metal 25 with a shielding signal S-AS. To achieve good active shielding performance, the first electrode E1 and the single shielding metal 25 have identical charging waveforms, e.g., Cgp1=Cgp-as (or Cgt1=Cgt-as to have identical charging phase), within the first time interval St1. Within the second time interval St2, the sensor chip 51 charges the second electrode E2 with a second driving signal S2 and charges the single shielding metal 25 with a shielding signal S-AS. To achieve good active shielding performance, the second electrode E2 and the single shielding metal 25 have identical charging waveforms, e.g., Cgp2=Cgp-as (or Cgt2=Cgt-as to have identical charging phase), within the second time interval St2.

The operating method associated with the first electrode E1 and the second electrode E2 mentioned above are also adaptable to other sensor electrodes E3 to EN as shown in FIGS. 3, 4 and 6, and thus details thereof are not repeated herein.

One implementation of the capacitive sensing device and system of the present disclosure is a self-capacitive sensing device and system.

It should be mentioned that although the single shielding metal 25 in the drawings of the present disclosure is shown to have a rectangular shape, the present disclosure is not limited thereto. In other aspects, the single shielding metal 25 have any shape as long as the single shielding metal 25 has an overlapped region respectively with the multiple sensor electrodes E1 to EN. For example, the single shielding metal 25 has a larger area corresponding to each sensor electrode and those larger areas are connected by at least one narrow region (e.g., forming connecting bridge).

As mentioned above, the conventional capacitive sensing system is arranged with multiple sets of sensing channels and shielding layers in order to reduce the noise interference. However, the conventional system has high layout complexity and high calculation load. Accordingly, the present disclosure further provides a capacitive sensing device (e.g., referring to FIG. 2) and capacitive sensing system (e.g., referring to FIG. 5) using active shielding and an operating method thereof (e.g., referring to FIG. 7). In the present disclosure, the circuit complexity is reduced by arranging a single shielding metal. The rest sensor electrodes other than a currently operating sensor electrode are used as ground shielding or active shielding to further improve the signal-to-noise ratio and improve the detection accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A capacitive sensing system, comprising:

an electrode layer, comprising:

a first electrode, connected to a first sensor line and configured to receive a first driving signal; and a second electrode, connected to a second sensor line and configured to receive a second driving signal; and a single shielding layer, configured to receive a shielding signal, and having an overlapped region with the first electrode and the second electrode, respectively, wherein the first driving signal is configured to charge the first electrode within a first time interval, the second driving signal is configured to charge the second electrode within a second time interval, which is behind the first time interval, the shielding signal is configured to be coupled to the single shielding layer within the first time interval and the second time interval to form active shielding, the first electrode and the second electrode have different areas, a charging waveform of the first electrode within the first time interval is different from that of the second electrode within the second time interval, and the single shielding layer is charged by the shielding signal to have different charging waveforms corresponding to the first time interval and the second time interval.

2. The capacitive sensing system as claimed in claim 1, further comprising an insulating layer arranged between the electrode layer and the single shielding layer.

3. The capacitive sensing system as claimed in claim 1, wherein the second electrode is grounded within the first time interval, and the first electrode is grounded within the second time interval.

4. A capacitive sensing system, comprising:

an electrode layer, comprising:

a first electrode, connected to a first sensor line and configured to receive a first driving signal; and a second electrode, connected to a second sensor line and configured to receive a second driving signal; and a single shielding layer, configured to receive a shielding signal, and having an overlapped region with the first electrode and the second electrode, respectively, wherein the first driving signal is configured to charge the first electrode within a first time interval, the second driving signal is configured to charge the second electrode within a second time interval, which is behind the first time interval, the shielding signal is configured to be coupled to the single shielding layer within the first time interval and the second time interval to form active shielding, the second electrode is coupled to a second shielding signal within the first time interval to form active shielding, and the first electrode is coupled to a first shielding signal within the second time interval to form active shielding.

5. The capacitive sensing system as claimed in claim 4, wherein the first electrode, the second electrode and the single shielding layer have identical charging waveforms within the first time interval and the second time interval.

6. The capacitive sensing system as claimed in claim 5, wherein the first electrode and the second electrode have different areas, the first driving signal and the second driving signal are respectively a first charging current and a second charging current, and the first charging current is different from the second charging signal to form the identical charging waveforms.

7. A capacitive sensing system, comprising:

an electrode layer, comprising:

a first electrode, connected to a first sensor line and configured to receive a first driving signal; and a second electrode, connected to a second sensor line and configured to receive a second driving signal;

a single shielding layer, configured to receive a shielding signal, and having an overlapped region with the first electrode and the second electrode, respectively; and an input capacitor and an operational amplifier coupled to the single shielding layer, wherein the input capacitor is arranged to have a capacitance identical to one of the first electrode and the second electrode having a larger ground capacitance.

8. A capacitive sensing system, comprising:

a sensor chip;

an input capacitor, connected to the sensor chip;

an electrode layer, comprising:

a first electrode, configured to receive a first driving signal from the sensor chip via a first sensor line; and a second electrode, configured to receive a second driving signal from the sensor chip via a second sensor line; and a single shielding metal, configured to receive a shielding signal from the sensor chip, and having an overlapped region with the first electrode and the second electrode, respectively; and an operational amplifier, connected between the single shielding metal and the input capacitor, wherein the input capacitor is arranged to have a capacitance identical to one of the first electrode and the second electrode having a larger ground capacitance.

9. The capacitive sensing system as claimed in claim 8, wherein the first driving signal, the second driving signal and the shielding signal are respectively configured to charge the first electrode, the second electrode and the single shielding metal within every sensing period, respectively.

10. The capacitive sensing system as claimed in claim 9, wherein the first electrode, the second electrode and the single shielding metal have identical charging waveforms within the every sensing period.

11. The capacitive sensing system as claimed in claim 8, wherein the operational amplifier is configured as a voltage follower.

12. The capacitive sensing system as claimed in claim 8, further comprising an insulating layer arranged between the electrode layer and the single shielding metal.

13. An operating method of a capacitive sensing system, the capacitive sensing system comprising a first electrode, a second electrode and a single shielding metal which has an overlapped region with the first electrode and the second electrode respectively, and the operating method comprising:

charging the first electrode and the single shielding metal within a first time interval, wherein the first electrode and the single shielding metal have identical charging waveforms within the first time interval; and charging the second electrode and the single shielding metal within a second time interval, wherein the second electrode and the single shielding metal have identical charging waveforms within the second time interval, wherein the single shielding metal is coupled to a sensor chip via an input capacitor and an operational amplifier, and the input capacitor is arranged to have a capacitance identical to one of the first electrode and the second electrode having a larger ground capacitance.

14. The operating method as claimed in claim 13, further comprising:

charging the second electrode within the first time interval to cause the second electrode and the first electrode to have the identical charging waveforms; and charging the first electrode within the second time interval to cause the first electrode and the second electrode to have the identical charging waveforms.

15. The operating method as claimed in claim 13, further comprising:

grounding the second electrode within the first time interval; and grounding the first electrode within the second time interval.

* * * * *